United States Patent
Imai et al.

(10) Patent No.: US 7,431,850 B2
(45) Date of Patent: Oct. 7, 2008

(54) PROCESS FOR PURIFICATION TREATMENT OF WASTEWATER CONTAINING ORGANIC SUBSTANCE

(75) Inventors: Genji Imai, Kanagawa (JP); Naonori Miyata, Kanagawa (JP); Takeshi Sako, Shizuoka (JP); Izumi Okajima, Shizuoka (JP)

(73) Assignee: Kansai Paint Co., Ltd., Amagasaki-shi (JP)

( * ) Notice: Subject to any disclaimer, the term of this patent is extended or adjusted under 35 U.S.C. 154(b) by 0 days.

(21) Appl. No.: 10/561,269

(22) PCT Filed: Jun. 18, 2004

(86) PCT No.: PCT/JP2004/008939

§ 371 (c)(1),
(2), (4) Date: Apr. 11, 2007

(87) PCT Pub. No.: WO2005/007578

PCT Pub. Date: Jan. 27, 2005

(65) Prior Publication Data

US 2007/0256972 A1  Nov. 8, 2007

(30) Foreign Application Priority Data

Jun. 19, 2003 (JP) .............................. 2003-174579
Jun. 19, 2003 (JP) .............................. 2003-174668
Jun. 19, 2003 (JP) .............................. 2003-174669

(51) Int. Cl.
*B01D 15/00* (2006.01)

(52) U.S. Cl. .................................................. 210/761

(58) Field of Classification Search ................... 210/761
See application file for complete search history.

(56) References Cited

U.S. PATENT DOCUMENTS 5,240,619 A    8/1993   Copa et al.

FOREIGN PATENT DOCUMENTS

| JP | H06-142407 A | 5/1994 |
|----|--------------|--------|
| JP | H11-290866 A | 10/1999 |
| JP | 2001-179074 A | 7/2001 |
| JP | 2002-102870 A | 4/2002 |
| JP | 2002-273459 A | 9/2002 |
| JP | 2002-331265 A | 11/2002 |
| JP | 2002-356450 A | 12/2002 |
| JP | 2003-088892 A | 3/2003 |
| JP | 2003-175392 A | 6/2003 |
| JP | 2003-251374 A | 9/2003 |
| JP | 2003-299941 A | 10/2003 |

OTHER PUBLICATIONS

Urano et al., Applications of High-Temperature and High-Pressure Water Reaction to Wastewater Treatment, Proceedings of Fifth International Symposium of Waste Management Problems in Agro-Industries, table of contents and pp. 359-364 (Shiga, Japan, Nov. 16-18, 2001).

*Primary Examiner*—Chester T. Barry
(74) *Attorney, Agent, or Firm*—Fitch, Even, Tabin & Flannery

(57) ABSTRACT

There is provided a process for purification treatment of wastewater containing an organic substance. There is provided a process for purification treatment of wastewater containing an organic substance by carrying out supercritical treatment or subcritical treatment, which comprises subjecting the wastewater to at least one solid-liquid separation pretreatment selected from separation treatment with a flocculant, sedimentation treatment, flotation treatment and filtration treatment; and then subjecting the wastewater to primary treatment as biological treatment; and subsequently purifying the wastewater by treatment including secondary treatment as supercritical treatment or subcritical treatment.

10 Claims, No Drawings

PROCESS FOR PURIFICATION TREATMENT OF WASTEWATER CONTAINING ORGANIC SUBSTANCE

This Application is the National Phase of International Application No. PCT/JP2004/008939 filed Jun. 18, 2004, which designated the U.S. and was not published under PCT Article 21(2) in English, and this application claims, via the aforesaid International Application, the foreign priority benefit of and claims the priority from Japanese Patent Application No. 2003-174579 filed Jun. 19, 2003, Japanese Patent Application No. 2003-174668 filed Jun. 19, 2003, and from Japanese Patent Application No. 2003-174669 filed Jun. 19, 2003, the complete disclosures of which are incorporated herein by reference.

TECHNICAL FIELD

The present invention relates to a process for purification treatment of wastewater containing an organic substance.

BACKGROUND ART

There has been known a process comprising flocculating, using a flocculant, a paint component that is contained in a waste liquid produced by cleaning an aqueous paint, and separating the flocculated matter from the waste liquid by filtration through a nonwoven fabric (Japanese Patent Laid-Open No. 2001-149948, "Patent Document 1").

On the other hand, there has also been known a process for treating organic waste, comprising a hydro thermal reaction treatment step of converting organic waste into a liquid by hydrothermal reaction under subcritical water conditions or supercritical water conditions, and an air oxidation treatment step of oxidizing the liquid produced by the hydrothermal reaction treatment with air. Furthermore, there has also been known a process for recovering methane gas, comprising the hydrothermal reaction treatment step or air oxidation treatment step, and a subsequent step of fermenting methane in the presence of sludge containing an *anaerobic* microorganism (Japanese Patent Laid-Open No. 2002-102870, "Patent Document 2").

In the case of the process described in Patent Document 1, wastewater filtered through a nonwoven fabric can be disposed in any place, and the nonwoven fabric and the flocculated matter can be disposed as industrial waste. However, the wastewater filtered through the nonwoven fabric contains a remaining component that cannot be flocculated by a flocculant, for example, a neutralizer component (e.g., an amine, acid), a curing agent component (e.g., a melamine curing agent), an organic solvent component (e.g., an alcoholic solvent), a resin component (e.g., a low molecular weight acrylic resin and a low molecular weight polyester resin), or another additive component. Accordingly, such wastewater cannot be disposed in rivers or the like, because the wastewater pollutes the environment, for example, if disposed there, disadvantageously.

It is also possible to use a process comprising removing an organic substance that causes the environmental pollution as described above from wastewater containing the organic substance by biological treatment with bacteria. However, in such biological treatment, it is difficult to remove by separation or decompose a low molecular weight component (molecular weight: about 1,000 or less) such as an amine or a melamine curing agent.

The process described in Patent Document 2 treats an organic substance directly by hydrothermal reaction under supercritical conditions. Thus, the process exhibits low treatment efficiency, and poorly decomposes a low molecular weight organic substance such as a melamine curing agent, amine or organic solvent, for example, disadvantageously when treating a waste liquid containing a solid such as sludge. Furthermore, it is difficult even for the biological treatment to fully decompose and remove the low molecular weight organic substance remaining after the supercritical treatment.

An object of the present invention is to provide a process for treating wastewater which can efficiently separate and remove a low molecular weight organic substance that cannot be separated and removed in a conventional process and which provides wastewater containing only a small amount of a toxic substance.

DISCLOSURE OF THE INVENTION

The present invention provides the following processes for purification treatment of wastewater.

(1) A process for purification treatment of wastewater containing an organic substance, which comprises subjecting the wastewater containing an organic substance to treatment complementary to supercritical treatment or subcritical treatment, and then purifying the wastewater by treatment including supercritical treatment or subcritical treatment (hereinafter may be called "process A").

(2) A process for purification treatment of wastewater containing an organic substance, which comprises subjecting the wastewater containing an organic substance to treatment complementary to supercritical treatment or subcritical treatment, then treating the wastewater supercritically or subcritically, and subsequently purifying the wastewater by treatment including biological treatment (hereinafter may be called "process B").

(3) A process for purification treatment of wastewater containing an organic substance, which comprises treating the wastewater containing an organic substance biologically, and then purifying the wastewater by treatment including supercritical treatment or subcritical treatment (hereinafter may be called "process C").

The complementary treatment used in the present invention can be at least one physical complementary treatment selected from separation treatment with a flocculant, sedimentation treatment, flotation treatment and filtration treatment.

The complementary treatment used in the present invention can be at least one chemical treatment selected from oxidation reduction treatment, microwave treatment and treatment with an inorganic substance.

The oxidation reduction treatment used in the present invention can be electrolytic treatment.

In the process for purification treatment of wastewater containing an organic substance of the present invention, the supercritical treatment or subcritical treatment and the treatment with an inorganic substance can be carried out at the same time.

In the process for purification treatment of wastewater containing an organic substance of the present invention, the treatment with an inorganic substance can be carried out after the supercritical treatment or subcritical treatment.

In the present invention, the microwave treatment and the treatment with an inorganic substance can be carried out at the same time.

In the present invention, in order to carry out the electrolytic treatment, it is possible to employ a method in which wastewater containing an organic substance is supplied to an electrolytic cell equipped with aluminum electrodes, and sodium nitrate is used as an electrolyte.

In the present invention, the inorganic substance can be at least one inorganic compound selected from $12CaO \cdot 7Al_2O_3$, alkaline earth metal oxides and alkaline earth metal hydroxides.

In the present invention, heating can be carried out in the step of treatment with an inorganic substance.

In the present invention, the microwave treatment can be carried out in the presence of an inorganic substance.

BEST MODE FOR CARRYING OUT THE INVENTION

The process A, process B and process C of the present invention can be used for various kinds of wastewater containing an organic substance. In particular, the processes are preferably used for wastewater produced in painting. Specific examples include paint booth water in various painting lines and sheet metal factories; and wastewater produced by cleaning an aqueous paint attached to paint production equipment, a painting instrument, a jig, or the like.

The process A will be described in detail below.

The complementary treatment used in the process A is a treatment complementary to supercritical treatment or subcritical treatment (hereinafter, such treatment is also referred to as "U treatment"). By use of the complementary treatment, the U treatment can be carried out briefly, and wastewater containing only a small amount of an organic substance can be obtained.

The complementary treatment includes a physical method (Phy method) and a chemical method (Chem method). An example of the Phy method is a method of solid-liquid separation of a solid substance (sludge) contained in drainage. The solid-liquid separation treatment can reduce the amount of wastewater to be treated in the U treatment, and consequently allows the U treatment to be carried out briefly. On the other hand, the Chem method is a method of chemically decomposing a poorly decomposable organic substance that cannot be separated by the U method into a readily decomposable organic substance.

Examples of the Phy method include separation treatment with a flocculant, sedimentation treatment, flotation treatment and filtration treatment.

This treatment typically treats painting wastewater to produce, approximately, 1 to 100 g/L of a precipitate, 1,000 to 8,000 mg/L of $COD_{Mn}$, 1,000 to 8,000 mg/L of TOC, 1,000 to 8,000 mg/L of BOD and 1 to 10,000 mg/L of an organic solvent. Here, $COD_{Mn}$ refers to chemical oxygen demand, TOC refers to total organic carbon, and BOD refers to biochemical oxygen demand. Examples of the organic solvent include an aqueous ether or alcohol solvent.

The above-described separation treatment with a flocculant is conventionally known treatment of adding a flocculant to wastewater containing an organic substance such as painting wastewater, and rendering insoluble and flocculating a solid of an organic substance, an inorganic substance or the like such as a pigment or a resin in the wastewater.

The separation treatment with a flocculant separates and removes the sludge floated or sedimented. The separated sludge is dehydrated to be solid sludge. The remaining wastewater containing an organic substance, from which the sludge has been removed, is subjected to supercritical treatment or subcritical treatment as secondary treatment, after carrying out the Chem method if necessary.

A conventionally known inorganic salt or polymer flocculant can be used as the flocculant. Examples of the inorganic salt include PAC (polyaluminum chloride), aluminum sulfate (sulfuric acid band), sodium aluminum oxide, polyaluminum chloride, ferric chloride, ferrous sulfate and ferric sulfate. Examples of the polymer flocculant include polyacrylate, polyacrylamide, sodium polyacrylate, modified polyacrylamide, polymethacrylate, polyamide, polyamine, an amino condensate, a maleic acid copolymer, quaternary ammonium salt, polyvinylpyridine, polyoxyethylene, sodium alginate, a water-soluble aniline resin, polythiourea and polyethyleneimine. These flocculants can be used singly or in a combination of two or more according to the type of wastewater.

The sedimentation treatment described above is a separation method making use of the difference in density between water and organic and/or inorganic suspended matters or solid particles in wastewater. Examples include sedimentation treatment by gravity and centrifugation treatment. In particular, in the centrifugation treatment, since a solid such as a suspended matter or solid particles has a density larger than that of water, solid-liquid separation is carried out briefly by a large centrifugal force. The centrifugation can be carried out in a conventionally known centrifuge such as, for example, a continuous horizontal centrifuge or a batch vertical centrifuge. The remaining wastewater containing an organic substance, from which the sludge has been removed, is subjected to supercritical treatment or subcritical treatment, after carrying out the Chem method if necessary.

The flotation treatment described above is separation treatment of introducing microbubbles into wastewater and attaching the microbubbles to organic and/or inorganic suspended matters or solid particles to reduce the apparent gravity of the particles and float the particles on the wastewater surface. The flotation treatment can be carried out in conventionally known flotation equipment such as, for example, whole pressure flotation equipment, partial pressure flotation equipment, circulating pressure flotation equipment or atmospheric pressure flotation equipment.

The remaining wastewater containing an organic substance, from which the sludge has been removed, is subjected to supercritical treatment or subcritical treatment, after carrying out the Chem method if necessary.

The filtration treatment described above can be carried out using, for example, a screen, fabric, filter or sieve under atmospheric pressure or under pressure. The treatment can be carried out singly or in a combination of two or more.

Examples of the Chem method include oxidation reduction treatment, microwave treatment and decomposition treatment with an inorganic substance. The treatment can be carried out singly or in a combination of two or more. In particular, a combination of microwave treatment with decomposition treatment with an inorganic substance is preferably used. Any of these treatments can be repeated if necessary. Examples of a combination of two or more treatments to be repeated include a method comprising microwave treatment in the presence of $12CaO \cdot 7Al_2O_3$, subsequent microwave treatment in the presence of an alkaline earth metal oxide, and repeated microwave treatment in the presence of $12CaO \cdot 7Al_2O_3$ and/or microwave treatment in the presence of an alkaline earth metal oxide.

The oxidation reduction treatment oxidizes or reduces an organic substance in wastewater to cause a chemical change in the organic substance, and thereby helps decompose the substance efficiently by supercritical treatment or subcritical treatment. Examples of the oxidation reduction treatment include treatment by an oxidizing agent (e.g., $H_2O_2$, $K_2Cr_2O_7$, $KMnO_4$, $O_3$, $O_2$, NaOCl or a halogen element) or a reducing agent (e.g., $H_2$, $SO_2$, $H_2S$, $Na_2SO_3$ or $FeSO_4$) and electrolytic treatment described below.

The electrolytic treatment is a method comprising placing electrodes in wastewater containing an organic substance such as painting wastewater and applying direct current to the wastewater to carry out electrolytic reaction. In this treatment, electrons are incorporated in the cathode to cause oxidation reaction, and electrons are emitted from the anode to cause reduction reaction.

The electrolytic treatment can also carry out adsorption of a solid of an organic substance, an inorganic substance or the like such as a pigment or a resin in wastewater on microbubbles of oxygen and hydrogen produced by electrolysis of the water to recover the substance on the wastewater surface by buoyancy of the bubbles, in addition to the above-described oxidation reduction reaction.

The electrolytic treatment separates and removes the sludge floated or sedimented. The separated sludge is dehydrated to be solid sludge. The remaining wastewater containing an organic substance, from which the sludge has been removed, is subjected to supercritical treatment or subcritical treatment as secondary treatment.

The electrolytic treatment is typically carried out by placing and dissolving an electrolyte in wastewater supplied. A treatment vessel used in this case has a plurality of electrodes placed at appropriate intervals. The electrolysis can be carried out by applying current to a space between the electrodes. Aluminum electrodes can be used as the electrodes, and sodium nitrate, sodium chloride or the like is suitably used as the electrolyte.

In the above-described electrolytic treatment, the electrolyte concentration (for example, sodium nitrate concentration) is about 0.01 to 0.05 mol/L based on 20,000 mg/L of the solid concentration.

The microwave treatment described above is treatment of irradiating an organic substance in wastewater with microwaves to cause a chemical change in the organic substance. By this treatment, the organic substance is decomposed itself or is made readily decomposed by supercritical treatment or subcritical treatment.

A microwave is an electromagnetic wave having a wavelength of about 0.1 to 1,000 mm. Examples include UHF (decimetric wave), SHF (centimetric wave), EHF (millimetric wave) and submillimetric wave. 2,450 MHz internationally allocated for industrial use is often used, but the microwave is not limited thereto.

The microwave treatment can be carried out using a microwave generator used in a microwave oven or the like.

The microwave irradiation time can be appropriately selected according to the concentration of the organic substance in wastewater, the intensity of irradiation light, or the like, but is typically preferably 1 to 60 minutes approximately.

Wastewater is heated by irradiation with microwaves. However, it is not particularly necessary to cool down the wastewater if an operational risk such as boiling of the wastewater or volatilization of the organic solvent does not occur. This is because the organic substance is decomposed faster as the temperature increases, generally. The temperature of wastewater is preferably as high as possible.

The microwave treatment can be carried out, for example, using a solid catalyst with oxygen-containing gas supplied. The microwave treatment oxidizes and decomposes an organic substance.

As the solid catalyst, a conventionally known solid catalyst can be used without specific limitations. Examples of the solid catalyst that can be used include an insoluble or poorly soluble compound of a metal element selected from titanium, silicon, zirconium, manganese, iron, cobalt, nickel, tungsten, cerium, copper, silver, gold, platinum, palladium, rhodium, ruthenium, iridium and the like; and an inorganic carrier (particles of an inorganic acid, activated carbon, zeolite or the like) with such a metal carried.

The decomposition treatment with an inorganic substance causes a chemical change in an organic substance in wastewater using an inorganic compound such as $12CaO \cdot 7Al_2O_3$, an alkaline earth metal oxide or an alkaline earth metal hydroxide. By this treatment, the organic substance is decomposed itself or is made readily decomposed by supercritical treatment or subcritical treatment. The decomposition treatment with an inorganic substance and the U treatment can be carried out at the same time.

The above-described $12CaO \cdot 7Al_2O_3$ is crystals of $12CaO \cdot 7Al_2O_3$ called C12A7, and is typically obtained by heating and calcining a mixture of calcium carbonate with aluminum oxide at 1,200° C. to 1,400° C. The calcining reaction may be carried out in a normal atmosphere, but is preferably carried out in a pure oxygen atmosphere in order to decompose an organic substance effectively. As the $12CaO \cdot 7Al_2O_3$, a $12CaO \cdot 7Al_2O_3$ compound disclosed in Japanese Patent Laid-open No. 2002-3218 which includes activated oxygen at a high concentration can be used.

The decomposition treatment of wastewater containing an organic substance using the above $12CaO \cdot 7Al_2O_3$ is carried out by adding the $12CaO \cdot 7Al_2O_3$ to the wastewater and stirring the mixture while heating if necessary. After completion of the treatment, $12CaO \cdot 7Al_2O_3$ can be recovered by filtration (or precipitation) and reused.

The amount of $12CaO \cdot 7Al_2O_3$ added is appropriately selected according to the type or concentration of the organic substance contained in wastewater, and is typically about 0.1 to 40 wt %, and preferably about 0.5 to 15 wt % based on the wastewater. If the amount is less than 0.1 wt %, it is difficult to sufficiently decompose the organic substance. On the other hand, if more than 40 wt %, it is difficult to sufficiently stir the wastewater in a treatment vessel, and the treatment involves a high cost, undesirably.

In the above treatment, the inorganic substance can decompose an organic substance more efficiently by heating. As heating means, microwave irradiation is particularly suitable.

The above-described alkaline earth metal oxide and/or hydroxide is preferably insoluble in water. As an alkaline earth metal, calcium is particularly suitable in terms of cost as well as efficiency in decomposition of an organic substance. The alkali earth metal oxide is reacted with water to yield a hydroxide. In this case, they are exothermically and intensely reacted with each other. Thus, the alkaline earth metal hydroxide is more preferable in terms of handleability and stability. As the alkaline earth metal oxide and/or hydroxide, a composite metal oxide and/or hydroxide containing an alkaline earth metal may be used.

The decomposition treatment of wastewater containing an organic substance with the above alkali earth metal oxide and/or hydroxide is carried out by adding the alkali earth metal oxide and/or hydroxide to the wastewater and stirring the mixture while heating if necessary. After completion of the treatment, the alkali earth metal oxide and/or hydroxide can be recovered by filtration and reused.

The amount of the alkali earth metal oxide and/or hydroxide added is appropriately selected according to the type or concentration of the organic substance contained in wastewater, and is typically about 0.1 to 50 wt %, and preferably about 1 to 20 wt % based on the wastewater. If the amount is less than 0.1 wt %, it is difficult to sufficiently decompose the organic substance. On the other hand, if more than 50 wt %, it is difficult to sufficiently stir the wastewater in a treatment vessel, and the treatment involves a high cost, undesirably.

In the above treatment, an organic substance can be decomposed more efficiently by heating. As heating means, microwave irradiation is particularly suitable.

As the complementary treatment in the process A of the present invention, the above-described Phy method or Chem method can be carried out alone, or the Phy method can be carried out in combination with the Chem method to be subsequently carried out. When these methods are carried out in combination, it is preferable to carry out the Chem method after removing the solid by the Phy method if wastewater contains the solid at a particularly high concentration.

The U treatment in the process A of the present invention is treatment of oxidizing, using supercritical water or subcritical water, a waste liquid containing an organic substance that can be made readily decomposed by oxidation due to the complementary treatment so as to decompose the organic substance.

Supercritical water refers to water under supercritical conditions, specifically, water at a temperature higher than a critical temperature of 374.1° C. and at a pressure higher than a critical pressure of 22.12 MPa. Subcritical water refers to water that exhibits the same effects as in supercritical water, and typically has a temperature in Kelvin 0.65 time or more the critical temperature and a pressure 0.65 time or more the critical pressure. The water in such a state cannot be liquefied even if pressure is applied further. Supercritical water or subcritical water cannot be called a gas or a liquid in terms of physical properties, and has characteristics between a gas and a liquid. Supercritical water or subcritical water exists as a single phase without a gas-liquid boundary. Specifically, supercritical water or subcritical water as a single phase is mixed with oxygen or the like at any ratio, and is thus particularly useful as a reaction solvent in the oxidation decomposition of an organic substance.

In the oxidation treatment with supercritical water or subcritical water, a conventionally known oxidizing agent (e.g., $H_2O_2$, $K_2Cr_2O_7$, $KMnO_4$, $O_3$, $O_2$, NaOCl or a halogen element) may exist if necessary. The ratio thereof is typically 0.5 to 50 parts by weight, and preferably 1 to 20 parts by weight based on 100 parts by weight of wastewater.

The supercritical treatment or subcritical treatment may also be carried out while blowing oxygen or air to wastewater.

The conditions of the supercritical treatment or subcritical treatment are not limited insofar as the conditions meet the above-described critical conditions. Typically, the reaction temperature is 300 to 800° C., and preferably 400 to 600° C., the pressure is 88 to 300 atm (8.9 to 30.4 MPa), and preferably 100 to 170 atm (10.1 to 17.2 MPa), and the reaction time is 30 seconds to 180 minutes, and preferably 5 to 90 minutes.

In the supercritical treatment or subcritical treatment, almost all organic substances are converted into a gaseous product (e.g., CO, $H_2$, $CH_4$ or $CO_2$) and a volatile substance such as an alcohol, aldehyde or furan by hydrolysis reaction or thermal decomposition reaction. An organic substance is decomposed into water and hydrocarbon gas in several seconds to several minutes in the presence of oxygen. The organic substance can be separated as a salt from wastewater containing a hetero atom by addition of a basic substance. Wastewater containing 2% or more of a carbon component can be heated to 550° C. or more due to its inherent oxidation heat, and this is energetically advantageous as compared with the combustion method.

In order to carry out the supercritical treatment or subcritical treatment, an inorganic substance used in the above treatment with an inorganic substance is added to wastewater, and then the mixture is allowed to be in a supercritical state or a subcritical state. Thus, the treatment with an inorganic substance and the supercritical treatment or subcritical treatment can be carried out at the same time.

The U treatment can treat painting wastewater to produce less than 1,000 mg/L, and preferably less than 500 mg/L of $COD_{Mn}$, less than 1,000 mg/L, and preferably less than 500 mg/L of TOC, less than 1,000 mg/L, and preferably less than 500 mg/L of BOD, and less than 1 mg/L, and preferably less than 0.5 mg/L of an organic solvent.

If purified to attain the above level, the wastewater is discharged as is. If not, the treated water after the above U treatment is preferably purified by the complementary treatment or U treatment again as return water to attain the above level.

In the process A of the present invention, the above treatment with an inorganic substance can be carried out after the U treatment, if necessary.

The complementary treatment carried out in the process A of the present invention is treatment complementary to the supercritical treatment or subcritical treatment. Use of this complementary treatment allows the U treatment to be carried out briefly, and can provide wastewater containing only a small amount of an organic substance.

The supercritical water or subcritical water treatment can convert almost all organic substances into a gaseous product and a volatile substance by hydrolysis reaction or thermal decomposition reaction, and can decompose an organic substance into water and volatile gas briefly in the presence of oxygen.

Furthermore, in the treatment with $12CaO \cdot 7Al_2O_3$ as an inorganic substance, the inorganic substance is heated to act as a catalyst for decomposing an organic substance, and, in particular, the inorganic substance itself generates oxygen radicals to promote decomposition of an organic substance when heated in the presence of oxygen. Use of microwave heating means allows heating to be carried out briefly, and is effective for generating oxygen radicals.

In addition, the treatment with an alkaline earth metal as an inorganic substance is effective in that, for example, the hydroxyl ion possessed by the inorganic substance promotes hydrolysis of the alkyl ether bond in alkyl etherified melamine as a water-soluble curing agent that is contained in wastewater produced from a melamine-curable paint now conventionally used as a thermosetting paint.

The process B of the present invention is a process for purification treatment of wastewater containing an organic substance, which comprises subjecting the wastewater containing an organic substance to treatment complementary to supercritical treatment or subcritical treatment, then treating the wastewater supercritically or subcritically, and subsequently purifying the wastewater by treatment including biological treatment.

In the process B, treatment complementary to the U treatment is preferably carried out prior to the U treatment.

The complementary treatment can be at least one treatment selected from separation treatment with a flocculant, sedimentation treatment, flotation treatment and filtration treatment.

The complementary treatment can be at least one treatment selected from oxidation reduction treatment, microwave treatment and treatment with an inorganic substance.

The oxidation reduction treatment can be electrolytic treatment.

In the process B of the present invention, the supercritical treatment or subcritical treatment and the treatment with an inorganic substance can be carried out at the same time.

In the process B of the present invention, the treatment with an inorganic substance can be carried out between the supercritical treatment or subcritical treatment and the biological treatment.

In the process B of the present invention, the microwave treatment and the treatment with an inorganic substance can be carried out at the same time.

In order to carry out the electrolytic treatment, it is possible to employ a method in which wastewater containing an organic substance is supplied to an electrolytic cell equipped with aluminum electrodes, and sodium nitrate is used as an electrolyte.

The inorganic substance can be at least one inorganic compound selected from $12CaO\cdot 7Al_2O_3$, alkaline earth metal oxides and alkaline earth metal hydroxides.

Heating can be carried out in the step of treatment with an inorganic substance.

The microwave treatment can be carried out in the presence of an inorganic substance.

The complementary treatment used in the process B is carried out in the same method and under the same conditions as in the complementary treatment described for the process A. See the description regarding the complementary treatment described for the process A for details.

The U treatment in the process B is treatment of oxidizing, using supercritical water or subcritical water, a waste liquid containing an organic substance that can be made readily decomposed by oxidation due to the complementary treatment so as to decompose the organic substance contained in the waste liquid.

The U treatment can be carried out in the same manner as in the U treatment in the process A. See the description regarding the U treatment described for the process A for details.

In the process B of the present invention, the biological treatment is carried out after the U treatment.

In the biological treatment, an organic or inorganic carrier carries a microorganism, and the microorganism decomposes an organic substance in wastewater. The treatment is more efficient than the activated sludge method. Examples of the material for the organic carrier include, but are not limited to, a photocurable resin, polyurethane, polyvinyl alcohol, polyethylene, polyacrylamide, polyester, polypropylene, agar, alginic acid, carageenan, cellulose, dextran, agarose and an ion exchange resin. These materials may also be used in combination with an inorganic substance.

The microorganism used for the biological treatment may be appropriately selected from conventionally known aerobic bacteria and *anaerobic* bacteria. Examples of the aerobic bacteria include *Pseudomonas* bacteria and *Acetobacter* bacteria. Examples of the *anaerobic* bacteria include methane bacteria and *Clostridium* bacteria. The above biological treatment can be carried out at a treatment temperature of 10 to 40° C., at pH 6.0 to 9.0, and for a hydraulic retention time (HRT) of 24 to 48 hours, for example.

The complementary treatment carried out in the process B of the present invention is treatment chemically or physically complementary to the supercritical treatment or subcritical treatment. This complementary treatment allows the treatment to be carried out briefly, and can provide wastewater containing only a small amount of an organic substance. In addition, the complementary treatment can directly decompose an organic substance contained in wastewater, and can preliminarily decompose a poorly decomposable organic substance that cannot be decomposed in the U treatment into a readily decomposable organic substance.

Supercritical water or subcritical water exists as a single phase of supercritical water or subcritical water without a boundary between water as a liquid and oxygen as a gas, and is thus particularly useful as a reaction solvent for oxidation decomposition of an organic substance.

The supercritical treatment or subcritical treatment can convert almost all organic substances into a gaseous product and a volatile substance by hydrolysis reaction or thermal decomposition reaction, and can decompose an organic substance into water and volatile gas briefly by mixing the organic substance with oxygen.

Furthermore, in the treatment with $12CaO\cdot 7Al_2O_3$ as an inorganic substance, the inorganic substance is heated to act as a catalyst for decomposing an organic substance, and, in particular, the inorganic substance itself generates oxygen radicals to promote decomposition of an organic substance when heated in the presence of oxygen. Use of microwave heating means allows heating to be carried out briefly, and promotes generation of oxygen radicals.

In addition, the treatment with an alkaline earth metal as an inorganic substance is effective in that, for example, the hydroxyl ion possessed by the inorganic substance promotes hydrolysis of the alkyl ether bond in an alkyl etherified melamine curing agent as a water-soluble curing agent that is contained in wastewater produced from a melamine-curable paint now conventionally used as a thermosetting paint.

The process B of the present invention, in which the biological treatment is combined with the supercritical treatment or subcritical treatment, can particularly decompose an organic substance that cannot be oxidized and decomposed by the supercritical treatment or subcritical treatment.

The process C of the present invention is a process for purification treatment of wastewater containing an organic substance, which comprises treating the wastewater containing an organic substance biologically, and then purifying the wastewater by treatment including supercritical treatment or subcritical treatment.

The process C will be described in detail below.

In the process C of the present invention, solid-liquid separation treatment can be carried out prior to the biological treatment. The solid-liquid separation treatment can be at least one treatment selected from separation treatment with a flocculant, sedimentation treatment, flotation treatment and filtration treatment.

In the process C, intermediate treatment for promoting decomposition in the biological treatment and/or the supercritical treatment or subcritical treatment can be carried out between the solid-liquid separation treatment and the biological treatment.

The intermediate treatment can be at least one treatment selected from oxidation reduction treatment, microwave treatment and treatment with an inorganic substance.

The oxidation reduction treatment can be electrolytic treatment.

In the process C of the present invention, the treatment with an inorganic substance can be carried out between the biological treatment and the supercritical treatment or subcritical treatment.

In the process C of the present invention, in order to carry out the electrolytic treatment, it is possible to employ a method in which wastewater containing an organic substance is supplied to an electrolytic cell equipped with aluminum electrodes, and sodium nitrate is used as an electrolyte.

The inorganic substance can be at least one inorganic compound selected from $12CaO\cdot 7Al_2O_3$, alkaline earth metal oxides and alkaline earth metal hydroxides.

The treatment with an inorganic substance can be carried out while heating.

The heating can be carried out by the microwave treatment.

The biological treatment used in the process C of the present invention can be carried out in the same manner as in the biological treatment described for the process B. See the description regarding the biological treatment described for the process B for details.

The supercritical treatment or subcritical treatment used in the process C of the present invention can be carried out in the same manner as in the method described for the process A. See the description described for the process A for details.

In the present invention, prior to the biological treatment, treatment complementary to purification treatment by the biological treatment (primary treatment) or the supercritical treatment or subcritical treatment (secondary treatment) can be carried out. This treatment allows the U treatment to be carried out briefly, and can provide wastewater containing only a small amount of an organic substance. Such complementary treatment includes a physical method (Phy method) and a chemical method (Chem method). Such complementary treatment can be carried out in the same manner as in the complementary treatment (Phy treatment or Chem treatment) used in the process A. See the description regarding the complementary treatment described for the process A for details.

Examples of the Phy treatment include separation treatment with a flocculant, sedimentation treatment, flotation treatment and filtration treatment. These pretreatments can be carried out in the same manner as in the Phy method described for the process A. See the description regarding the Phy method for details.

The remaining wastewater containing an organic substance, from which the sludge has been removed by the Phy treatment, is subjected to the biological treatment as primary treatment, after carrying out the Chem treatment if necessary.

The filtration treatment used in the Phy treatment can be carried out using, for example, a screen, fabric, filter or sieve under atmospheric pressure or under pressure. The treatment can be carried out singly or in a combination of two or more.

The Chem treatment can be carried out in the same manner as in the Chem method described for the process A. See the description regarding the Chem method for details.

The Phy treatment or Chem treatment can be carried out alone in the process C of the present invention. Alternatively, the Phy treatment and the subsequent Chem treatment can be carried out in combination. When the treatments are carried out in combination, if wastewater contains a solid at a particularly high concentration, the Chem treatment is preferably carried out after removing the solid by the Phy treatment.

The treatment with an inorganic substance may be carried out between the biological treatment and the supercritical treatment or subcritical treatment.

The treatment with an inorganic substance is carried out by adding an inorganic substance to wastewater and then allowing the mixture to be in a supercritical state or a subcritical state. Thus, the treatment with an inorganic substance and the supercritical treatment or subcritical treatment can be carried out at the same time.

In the process C, the supercritical treatment or subcritical treatment can treat painting wastewater to produce less than 1,000 mg/L, and preferably less than 500 mg/L of $COD_{Mn}$, less than 1,000 mg/L, and preferably less than 500 mg/L of TOC, less than 1,000 mg/L, and preferably less than 500 mg/L of BOD, and less than 1 mg/L, and preferably less than 0.5 mg/L of an organic solvent.

If purified to attain the above level, the wastewater is discharged as is. If not, the treated water after the above U treatment is preferably purified by the Chem treatment or biological treatment again as return water to attain the above level.

The Phy treatment or Chem treatment carried out as the complementary treatment in the process C of the present invention is treatment chemically or physically complementary to the biological treatment or the supercritical treatment or subcritical treatment. Use of the complementary treatment allows the U treatment to be carried out briefly, and can provide wastewater containing only a small amount of an organic substance.

EXAMPLES

The present invention will now be described in more detail by way of examples.

Example 1

A dilution of an aqueous paint for automobiles (polyester/melamine curable type, solid concentration: 22.3 wt %) in water having a solid concentration of 2 wt % was used as a painting wastewater sample (A). In the sample (A) at the initial stage, $COD_{Mn}$ was 8,500 mg/L, TOC was 11,000 mg/L, and the amount of the melamine curing agent was $3.49 \times 10^3$ mV·sec. The amount of the melamine curing agent herein refers to the product (area) obtained by multiplying the detection potential by the detection time, which indicates the melamine curing agent in high performance liquid chromatography (HPLC) (hereinafter the same).

A sodium nitrate solution at a concentration of 0.02 mol/L was added to 280 g of the painting wastewater sample (A). The mixed solution was placed in an electrolytic cell, and stirred using a stirrer. Two aluminum electrode plates each having an electrode area (on one surface) of 35 cm$^2$ were placed with a distance between the electrodes of 20 mm, and the mixed solution was electrolytically treated by applying voltage at 10V to the electrodes for 0.17 hour.

Next, the resulting electrolytically treated water was filtered, 5 parts by weight of $H_2O_2$ was added to 100 parts by weight of the filtrate, and the mixture was treated in supercritical water at 500° C. and 25 MPa for 30 minutes. $COD_{Mn}$, TOC, and the amount of the melamine curing agent are shown in Table 1.

Example 2

To 280 g of the same painting wastewater (A) as above, 15,000 mg of a flocculant Kuristuck B100 (manufactured by Kurita Water Industries Ltd.) and 1,500 mg of Kuristuck B450 (manufactured by Kurita Water Industries Ltd.) were added. The mixture was stirred and then allowed to stand for one day, and the flocculated matter was removed therefrom. In the treated liquid (B) after the flocculation treatment, $COD_{Mn}$ was 5,800 mg/l and TOC was 6,800 mg/l. The treated liquid (B) was irradiated with microwaves (frequency: 2.45 GHz, output: 500 W) for five minutes.

Next, 5 parts by weight of $H_2O_2$ was added to 100 parts by weight of the resulting microwave-treated water, and the mixture was treated in supercritical water at 500° C. and 25 MPa for 30 minutes. $COD_{Mn}$, TOC, and the amount of the melamine curing agent in the treated liquid are shown in Table 1.

Example 3

$12CaO·7Al_2O_3$ having an amount corresponding to 10 wt % of the treated liquid (B) obtained in Example 2 ($12CaO·7Al_2O_3$ obtained by calcination in a pure oxygen atmosphere at 1,250° C. for three hours) was added to the treated liquid (B), and the mixture was stirred and then irradiated with microwaves (frequency: 2.45 GHz, output: 500 W) for 10 minutes. $COD_{Mn}$, TOC, and the amount of the melamine curing agent in the treated liquid (C) after the treatment with $12CaO·7Al_2O_3$ are shown in Table 1.

Next, 5 parts by weight of $H_2O_2$ was added to 100 parts by weight of the resulting treated water, and the mixture was treated in supercritical water at 500° C. and 25 MPa for 30 minutes. $COD_{Mn}$, TOC, and the amount of the melamine curing agent in the treated liquid are shown in Table 1.

Example 4

Calcium hydroxide having an amount corresponding to 10 wt % of the treated liquid (B) obtained in Example 2 was added to the treated liquid (B), and the mixture was stirred and then irradiated with microwaves (frequency: 2.45 GHz, output: 500 W) for 10 minutes. $COD_{Mn}$, TOC, and the amount of the melamine curing agent in the treated liquid (C) after the treatment with $12CaO \cdot 7Al_2O_3$ are shown in Table 1.

Next, 5 parts by weight of $H_2O_2$ was added to 100 parts by weight of the resulting treated water, and the mixture was treated in supercritical water at 500° C. and 25 MPa for 30 minutes. $COD_{Mn}$, TOC, and the amount of the melamine curing agent in the treated liquid are shown in Table 1.

Comparative Example 1

The same treatment as in Example 1 was carried out except for not carrying out the treatment with supercritical water in Example 1. $COD_{Mn}$, TOC, and the amount of the melamine curing agent in the treated liquid are shown in Table 1.

Comparative Example 2

The same treatment as in Example 2 was carried out except for not carrying out the treatment with supercritical water in Example 2. $COD_{Mn}$, TOC, and the amount of the melamine curing agent in the treated liquid are shown in Table 1.

Comparative Example 3

The same treatment as in Example 3 was carried out except for not carrying out the treatment with supercritical water in Example 3. $COD_{Mn}$, TOC, and the amount of the melamine curing agent in the treated liquid are shown in Table 1.

Comparative Example 4

The same treatment as in Example 4 was carried out except for not carrying out the treatment with supercritical water in Example 4. $COD_{Mn}$, TOC, and the amount of the melamine curing agent in the treated liquid are shown in Table 1.

In Table 1, the $COD_{Mn}$ unit is mg/L, the TOC unit is mg/L, and the unit of the amount of the melamine curing agent is mV·sec.

Example 5

A sodium nitrate solution at a concentration of 0.02 mol/L was added to 280 g of the painting wastewater sample (A) shown in Example 1. The mixed solution was placed in an electrolytic cell, and stirred using a stirrer. Two aluminum electrode plates each having an electrode area (on one surface) of 35 $cm^2$ were placed with a distance between the electrodes of 20 mm, and the mixed solution was electrolytically treated by applying voltage at 10V to the electrodes for 0.17 hour.

Next, the resulting electrolytically treated water was filtered, 5 parts by weight of $H_2O_2$ was added to 100 parts by weight of the filtrate, and the mixture was treated in supercritical water at 500° C. and 25 MPa for 30 minutes.

Next, the treated liquid was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered. $COD_{Mn}$, TOC, and the amount of the melamine curing agent are shown in Table 2.

Example 6

To 280 g of the same painting wastewater (A) as above, 15,000 mg of a flocculant Kuristuck B100 (manufactured by Kurita Water Industries Ltd.) and 1,500 mg of Kuristuck B450 (manufactured by Kurita Water Industries Ltd.) were added. The mixture was stirred and then allowed to stand for one day, and the flocculated matter was removed therefrom. In the treated liquid (B) after the flocculation treatment, $COD_{Mn}$ was 5,800 mg/l and TOC was 6,800 mg/l. The treated liquid (B) was irradiated with microwaves (frequency: 2.45 GHz, output: 500 W) for five minutes.

Next, the resulting microwave-treated water was treated in supercritical water at 500° C. and 25 MPa for 30 minutes.

TABLE 1

| | | Example | | | | Comparative Example | | | |
|---|---|---|---|---|---|---|---|---|---|
| | | 1 | 2 | 3 | 4 | 1 | 2 | 3 | 4 |
| Wastewater sample | $COD_{Mn}$ | | | | 8,500 | | | | |
| | TOC | | | | 11,000 | | | | |
| | Amount of melamine curing agent | | | | $3.49 \times 10^3$ | | | | |
| Treatment with flocculant | | | Yes | Yes | Yes | | Yes | Yes | Yes |
| Electrolytic treatment | | Yes | | | | Yes | | | |
| Microwave treatment | | | Yes | Yes | Yes | | Yes | Yes | Yes |
| Treatment with inorganic substance | | | | Yes | Yes | | | Yes | Yes |
| Before supercritical treatment | $COD_{Mn}$ | 6,400 | 6,200 | 6,200 | 6,500 | 6,400 | 6,200 | 6,200 | 6,500 |
| | TOC | 7,000 | 6,800 | 6,800 | 7,200 | 7,000 | 6,800 | 6,800 | 7,200 |
| | Amount of melamine curing agent | $3.25 \times 10^3$ | $3.31 \times 10^3$ | $3.19 \times 10^3$ | $3.47 \times 10^3$ | $3.25 \times 10^3$ | $3.31 \times 10^3$ | $3.19 \times 10^3$ | $3.47 \times 10^3$ |
| Supercritical treatment | | Yes | Yes | Yes | Yes | | | | |
| After supercritical treatment | $COD_{Mn}$ | 33 | 25 | 20 | 22 | | | | |
| | TOC | 40 | 39 | 37 | 38 | | | | |
| | Amount of Melamine curing agent | 10> | 10> | 10> | 10> | | | | |

Next, the treated liquid was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered. $COD_{Mn}$, TOC, and the amount of the melamine curing agent are shown in Table 2.

Example 7

$12CaO \cdot 7Al_2O_3$ having an amount corresponding to 10 wt % of the treated liquid (B) obtained in Example 6 ($12CaO \cdot 7Al_2O_3$ obtained by calcination in a pure oxygen atmosphere at 1,250° C. for three hours) was added to the treated liquid (B), and the mixture was stirred and then irradiated with microwaves (frequency: 2.45 GHz, output: 500 W) for 10 minutes. $COD_{Mn}$, TOC, and the amount of the melamine curing agent in the treated liquid (C) after the treatment with $12CaO \cdot 7Al_2O_3$ are shown in Table 2.

Next, 5 parts by weight of $H_2O_2$ was added to 100 parts by weight of the resulting treated water, and the mixture was treated in supercritical water at 500° C. and 25 MPa for 30 minutes.

Next, the treated liquid was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered. $COD_{Mn}$, TOC, and the amount of the melamine curing agent are shown in Table 2.

Example 8

Calcium hydroxide having an amount corresponding to 10 wt % of the treated liquid (B) obtained in Example 6 was added to the treated liquid (B), and the mixture was stirred and then irradiated with microwaves (frequency: 2.45 GHz, output: 500 W) for 10 minutes. $COD_{Mn}$, TOC, and the amount of the melamine curing agent in the treated liquid (C) after the treatment with $12CaO \cdot 7Al_2O_3$ are shown in Table 2.

Next, 5 parts by weight of $H_2O_2$ was added to 100 parts by weight of the resulting treated water, and the mixture was treated in supercritical water at 500° C. and 25 MPa for 30 minutes.

Next, the treated liquid was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered. $COD_{Mn}$, TOC, and the amount of the melamine curing agent are shown in Table 1.

Comparative Example 5

The same treatment as in Example 5 was carried out except for not carrying out the treatment with supercritical water in Example 5. $COD_{Mn}$, TOC, and the amount of the melamine curing agent are shown in Table 2.

Comparative Example 6

The same treatment as in Example 6 was carried out except for not carrying out the treatment with supercritical water in Example 6. $COD_{Mn}$, TOC, and the amount of the melamine curing agent are shown in Table 2.

Comparative Example 7

The same treatment as in Example 7 was carried out except for not carrying out the treatment with supercritical water in Example 7. $COD_{Mn}$, TOC, and the amount of the melamine curing agent are shown in Table 2.

Comparative Example 8

The same treatment as in Example 8 was carried out except for not carrying out the treatment with supercritical water in Example 8. $COD_{Mn}$, TOC, and the amount of the melamine curing agent are shown in Table 2.

TABLE 2

| | | Example | | | | Comparative Example | | | |
|---|---|---|---|---|---|---|---|---|---|
| | | 5 | 6 | 7 | 8 | 5 | 6 | 7 | 8 |
| Wastewater sample | $COD_{Mn}$ | | | | 8,500 | | | | |
| | TOC | | | | 11,000 | | | | |
| | Amount of Melamine curing agent | | | | $3.49 \times 10^3$ | | | | |
| Treatment with flocculant | | | Yes | Yes | Yes | | Yes | Yes | Yes |
| Electrolytic treatment | | Yes | | | | Yes | | | |
| Microwave treatment | | | Yes | Yes | Yes | | Yes | Yes | Yes |
| Treatment with inorganic substance | | | | Yes | Yes | | | Yes | Yes |
| Before supercritical treatment | $COD_{Mn}$ | 6,400 | 6,200 | 6,200 | 6,500 | 6,400 | 6,200 | 6,200 | 6,500 |
| | TOC | 7,000 | 6,800 | 6,800 | 7,200 | 7,000 | 6,800 | 6,800 | 7,200 |
| | Amount of melamine curing agent | $3.25 \times 10^3$ | $3.31 \times 10^3$ | $3.19 \times 10^3$ | $3.47 \times 10^3$ | $3.25 \times 10^3$ | $3.31 \times 10^3$ | $3.19 \times 10^3$ | $3.47 \times 10^3$ |
| Supercritical treatment | | Yes | Yes | Yes | Yes | No | No | No | No |
| Biological treatment | | Yes | Yes | Yes | Yes | Yes | Yes | Yes | Yes |
| After biological treatment | $COD_{Mn}$ | 13 | 9 | 5 | 7 | 140 | 120 | 120 | 150 |
| | TOC | 15 | 11 | 7 | 9 | 100 | 180 | 180 | 120 |
| | Amount of melamine curing agent | 10> | 10> | 10> | 10> | $4.01 \times 10^2$ | $5.51 \times 10^2$ | $5.19 \times 10^2$ | $5.68 \times 10^2$ | then irradiated with microwaves (frequency: 2.45 GHz, output: 500 W) for 10 minutes. $COD_{Mn}$, TOC, and the amount of the melamine curing agent in the treated liquid (C) after the treatment with $12CaO \cdot 7Al_2O_3$ are shown in Table 2.

Example 9

A sodium nitrate solution at a concentration of 0.02 mol/L was added to 280 g of the painting wastewater sample (A)

shown in Example 1. The mixed solution was placed in an electrolytic cell, and stirred using a stirrer. Two aluminum electrode plates each having an electrode area (on one surface) of 35 cm² were placed with a distance between the electrodes of 20 mm, and the mixed solution was electrolytically treated by applying voltage at 10V to the electrodes for 0.17 hour.

Then, the resulting electrolytically treated water was filtered. Next, the filtrate was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered. Next, 5 parts by weight of $H_2O_2$ was added to 100 parts by weight of the filtrate, and the mixture was treated in supercritical water at 500° C. and 25 MPa for 30 minutes. $COD_{Mn}$, TOC, and the amount of the melamine curing agent are shown in Table 3.

Example 10

To 280 g of the same painting wastewater (A) as above, 15,000 mg of a flocculant Kuristuck B100 (manufactured by Kurita Water Industries Ltd.) and 1,500 mg of Kuristuck B450 (manufactured by Kurita Water Industries Ltd.) were added. The mixture was stirred and then allowed to stand for one day, and the flocculated matter was removed therefrom. The treated liquid (B) after the flocculation treatment was irradiated with microwaves (frequency: 2.45 GHz, output: 500 W) for five minutes.

Next, the resulting microwave-treated water was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered. Next, 5 parts by weight of $H_2O_2$ was added to 100 parts by weight of the filtrate, and the mixture was treated in supercritical water at 500° C. and 25 MPa for 30 minutes. $COD_{Mn}$, TOC, and the amount of the melamine curing agent are shown in Table 3.

Example 11

$12CaO \cdot 7Al_2O_3$ having an amount corresponding to 10 wt % of the treated liquid (B) obtained in Example 10 ($12CaO \cdot 7Al_2O_3$ obtained by calcination in a pure oxygen atmosphere at 1,250° C. for three hours) was added to the treated liquid (B), and the mixture was stirred and then irradiated with microwaves (frequency: 2.45 GHz, output: 500 W) for 10 minutes. $COD_{Mn}$, TOC, and the amount of the melamine curing agent in the treated liquid (C) after the treatment with $12CaO \cdot 7Al_2O_3$ are shown in Table 3.

Next, the treated liquid was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered.

Next, 5 parts by weight of $H_2O_2$ converted to 100 wt % was added to 100 parts by weight of the resulting treated water, and the mixture was treated in supercritical water at 500° C. and 25 MPa for 30 minutes. $COD_{Mn}$, TOC, and the amount of the melamine curing agent are shown in Table 3.

Example 12

Calcium hydroxide having an amount corresponding to 10 wt % of the treated liquid (B) obtained in Example 10 was added to the treated liquid (B), and the mixture was stirred and then irradiated with microwaves (frequency: 2.45 GHz, output: 500 W) for 10 minutes. Next, the treated liquid (C) after the treatment was placed in a biological reaction vessel, and biologically treated with activated sludge having *Pseudomonas, Acetobacter, Rhodococcus, Bacillus, Candida* and *Fusarium* aerobic bacteria at a treatment temperature of 20 to 25° C., at pH 7 to 8.5 and for a hydraulic retention time of 48 hours. Then, the biologically treated water was filtered.

Next, 5 parts by weight of $H_2O_2$ was added to 100 parts by weight of the resulting treated water, and the mixture was treated in supercritical water at 500° C. and 25 MPa for 30 minutes. $COD_{Mn}$, TOC, and the amount of the melamine curing agent are shown in Table 3.

Comparative Example 9

The same treatment as in Example 9 was carried out except for not carrying out the treatment with supercritical water in Example 9. $COD_{Mn}$, TOC, and the amount of the melamine curing agent are shown in Table 3.

Comparative Example 10

The same treatment as in Example 10 was carried out except for not carrying out the treatment with supercritical water in Example 10. $COD_{Mn}$, TOC, and the amount of the melamine curing agent are shown in Table 3.

Comparative Example 11

The same treatment as in Example 11 was carried out except for not carrying out the treatment with supercritical water in Example 11. $COD_{Mn}$, TOC, and the amount of the melamine curing agent are shown in Table 3.

Comparative Example 12

The same treatment as in Example 12 was carried out except for not carrying out the treatment with supercritical water in Example 12. $COD_{Mn}$, TOC, and the amount of the melamine curing agent are shown in Table 3.

TABLE 3

| | | Example | | | | Comparative Example | | | |
|---|---|---|---|---|---|---|---|---|---|
| | | 9 | 10 | 11 | 12 | 9 | 10 | 11 | 12 |
| Wastewater sample | $COD_{Mn}$ | | | | | 8,500 | | | |
| | TOC | | | | | 11,000 | | | |
| | Amount of melamine curing agent | | | | | $3.49 \times 10^3$ | | | |
| Treatment with flocculant | | | Yes | Yes | Yes | | Yes | Yes | Yes |
| Electrolytic treatment | | Yes | | | | Yes | | | |

TABLE 3-continued

| | | Example | | | | Comparative Example | | | |
|---|---|---|---|---|---|---|---|---|---|
| | | 9 | 10 | 11 | 12 | 9 | 10 | 11 | 12 |
| Microwave treatment | | | Yes | Yes | Yes | | Yes | Yes | Yes |
| Treatment with inorganic substance | | | Yes | Yes | Yes | | Yes | Yes | Yes |
| Before supercritical treatment | $COD_{Mn}$ | 6,400 | 6,200 | 6,200 | 6,500 | 6,400 | 6,200 | 6,200 | 6,500 |
| | TOC | 7,000 | 6,800 | 6,800 | 7,200 | 7,000 | 6,800 | 6,800 | 7,200 |
| | Amount of melamine curing agent | $3.25 \times 10^3$ | $3.31 \times 10^3$ | $3.19 \times 10^3$ | $3.47 \times 10^3$ | $3.25 \times 10^3$ | $3.31 \times 10^3$ | $3.19 \times 10^3$ | $3.47 \times 10^3$ |
| Supercritical treatment | | Yes | Yes | Yes | Yes | No | No | No | No |
| Biological treatment | | Yes | Yes | Yes | Yes | Yes | Yes | Yes | Yes |
| After biological treatment | $COD_{Mn}$ | 13 | 9 | 5 | 7 | 140 | 120 | 120 | 150 |
| | TOC | 15 | 11 | 7 | 9 | 100 | 180 | 180 | 120 |
| | Amount of melamine curing agent | 10> | 10> | 10> | 10> | $4.01 \times 10^2$ | $5.51 \times 10^2$ | $5.19 \times 10^2$ | $5.68 \times 10^2$ |

The invention claimed is:

1. A process for purification treatment of wastewater containing an organic substance, which comprises subjecting the wastewater containing an organic substance to treatment complementary to supercritical treatment or subcritical treatment, and then purifying the wastewater by treatment including supercritical treatment or subcritical treatment, wherein the complementary treatment is at least one treatment selected from among the following treatments (a)-(c):

(a) at least one physical treatment selected from among separation treatment with a flocculant, sedimentation treatment, flotation treatment, and filtration treatment;
  (b) electrolytic oxidation reduction treatment; and
  (c) microwave treatment and treatment with an inorganic substance carried out simultaneously.

2. The purification treatment process according to claim 1, wherein said complementary treatment is (a).

3. The purification treatment process according to claim 1, wherein said complementary treatment is (b).

4. The purification treatment process according to claim 1, wherein said complementary treatment is (c).

5. The purification treatment process according to claim 1, wherein, in order to carry out the treatment (b), the wastewater containing an organic substance is supplied to an electrolytic cell equipped with aluminum electrodes, and sodium nitrate is used as an electrolyte.

6. The purification treatment process according to claim 1, wherein the inorganic substance used in the treatment (c) is at least one inorganic compound selected from $12CaO \cdot 7Al_2O_3$, an alkaline earth metal oxide and an alkaline earth metal hydroxide.

7. A process for purification treatment of wastewater containing an organic substance, which comprises subjecting the wastewater containing an organic substance to treatment complementary to supercritical treatment or subcritical treatment, and then treating the wastewater supercritically or subcritically, and subsequently purifying the wastewater by treatment including biological treatment, wherein the complementary treatment is at least one treatment selected from among the following treatments (a)-(c):

(a) at least one physical treatment selected from among separation treatment with a flocculant, sedimentation treatment, flotation treatment, and filtration treatment;
  (b) electrolytic oxidation reduction treatment; and
  (c) microwave treatment and treatment with an inorganic substance carried out simultaneously.

8. The purification treatment process according to claim 7, wherein said complementary treatment is (a).

9. The purification treatment process according to claim 7, wherein said complementary treatment is (b).

10. The purification treatment process according to claim 7, wherein said complementary intermediate treatment is (c).

* * * * *